UNITED STATES PATENT OFFICE.

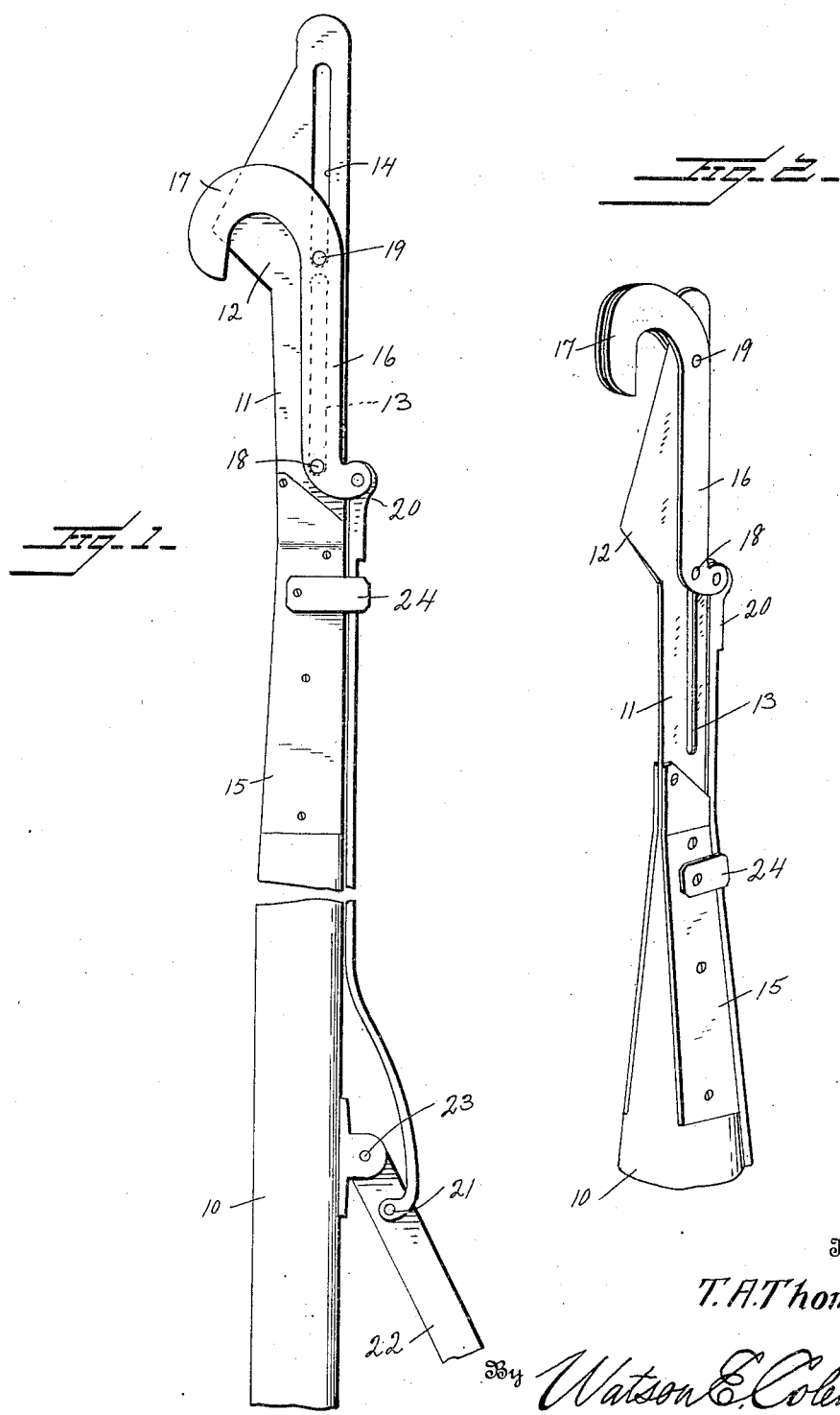

THOMAS A. THOMPSON, OF ROCHESTER, NEW YORK.

PRUNING IMPLEMENT.

1,362,273.

Specification of Letters Patent.

Patented Dec. 14, 1920.

Application filed January 13, 1919. Serial No. 270,915.

*To all whom it may concern:*

Be it known that I, THOMAS A. THOMPSON, a citizen of the United States, residing at Rochester, in the county of Monroe and State of New York, have invented certain new and useful Improvements in Pruning Implements, of which the following is a specification, reference being had to the accompanying drawings.

This invention relates to cutting implements and particularly to implements designed for the purpose of pruning trees and bushes or for cutting off small branches of trees and bushes.

The general object of the invention is to provide an implement of this character by which great power may be transmitted to the cutters so that relatively slight force is needed in order to perform the cutting operation.

A further object is to provide a device of this kind wherein a shearing cut is given by drawing the branch to be cut against the cutting edge of a blade which cutting edge is disposed at an angle to the direction of pull.

A further object is to improve the details of construction of devices of this character and provide means whereby the parts may be readily assembled, and provide for a relatively easy grinding on the cutting blades.

Other objects will appear in the course of the following description.

My invention is illustrated in the accompanying drawings, wherein:—

Figure 1 is a side elevation of my pruning implement with the hooks retracted; and Fig. 2 is a perspective view showing the hooks raised with relation to the blade.

Referring to the drawings, 10 designates the handle upon which the cutter is mounted. The upper end of the handle is tapered and disposed at this upper end is the shank 11 of a cutting blade 12. This shank is longitudinally slotted as at 13 and the blade is longitudinally slotted as at 14. The shank 11 is held to the handle by the two metallic cleats 15, which are riveted, screwed or otherwise attached to the shank 11 and which are divergently disposed to embrace the tapered end of the handle. Slidingly mounted upon opposite faces of the back of the blade 12 are the shanks 16 of the jaws 17. Each shank is provided with a jaw 17 and these shanks are disposed on each side of the blade 12. A screw, rivet or like member 18 passes through the shank 16 and through the slot 13 and a screw, rivet or like member 19 passes through the shank 16 and through the slot 14. Thus the jaws are held for longitudinal sliding movement upon the knife and the shank thereof and are securely braced against any lateral shifting relative thereto. It will be noted that the apex of the cutting knife 12 is disposed somewhat beyond the inner line of the hooks 17.

Pivotally connected to the outwardly turned ends of the shanks 16 is a rod 20 which extends along the back of the handle and at its outer end is outwardly bowed and pivotally connected as at 21 to an operating lever 22 which is pivoted to ears 23 on the handle 10. This rod 20 may extend through suitable rods 24 mounted at intervals upon the handle.

The practical use of this device will be obvious from what has gone before. The branch to be cut is caught within the hooks 17 and then the lever 22 is manipulated to draw the hooks toward the cutting edge of the knife thus causing the knife to exert a shearing cut upon the branch to sever it. It will be seen that by pulling the branch toward the inclined cutting edge of the knife that a very powerful action may be exerted on the branch much more powerful than can be exerted where two jaws are simply brought together as in the usual pruning shears and that this is particularly true where the cutting shears have to be mounted on the ends of the long handle as where pruning is being done in trees.

One of the particular advantages of my pruning implement lies in the fact that the pruning knife will cut a branch without leaving any stub therein, which is impossible with pruning shears. If pruning shears engage a branch at an angle to the axis of the branch, the jaws of the shears will be forced apart and this will leave a strip of bark clinging to the stub or stump, or the jaws will break. This is not the case with my device, because of the fact that the cutting blade operates between the shanks and hooks 16 and 17 which form guides for the cutting blade, thereby allowing a branch to be engaged at any angle without any chance of there being a stub or strip left on the stump of the branch. Furthermore, it will be noted that while in ordinary pruning implements the cutting edge is forced against and into the branch at right angles to the axis thereof, in my device there is a shearing cut and the load is evenly distributed throughout the cut.

I claim:

A pruning implement comprising a handle, a relatively thin shank extending from the handle, the shank being formed parallel to its back with upper and lower longitudinally extending slots, and opposite the back with a cutting edge acutely inclined relative to the back, said cutting edge facing away from the handle, hook-shaped members disposed on each side of the shank, fitting closely against the same and bracing it and extending parallel to the back, and having members passing through said slots and guiding the hook-shaped members, the bills of the hook-shaped members extending outward from the cutting edge and then backward from the handle, those ends of the hook-shaped members adjacent the handle being extended rearward beyond the rear edges of the shank, an operating lever mounted upon the handle and a link pivotally connected at one end to the handle and pivotally connected to the rearwardly extending portions of the hook-shaped members.

In testimony whereof I hereunto affix my signature in the presence of two witnesses.

THOMAS A. THOMPSON.

Witnesses:
  JENNING W. ROBERTS,
  WILLIAM M. ROBERTS.